(12) United States Patent  
Jeon (10) Patent No.: US 7,110,057 B2  
(45) Date of Patent: Sep. 19, 2006

(54) LIQUID CRYSTAL DISPLAY DEVICE

(75) Inventor: Jae Young Jeon, Daegu (KR)

(73) Assignee: LG. Philips LCD Co., Ltd., Seoul (KR)

( * ) Notice: Subject to any disclaimer, the term of this patent is extended or adjusted under 35 U.S.C. 154(b) by 167 days.

(21) Appl. No.: 10/328,396

(22) Filed: Dec. 23, 2002

(65) Prior Publication Data

US 2003/0117536 A1 Jun. 26, 2003

(30) Foreign Application Priority Data

Dec. 26, 2001 (KR) .............................. P2001-85371

(51) Int. Cl.
G02F 1/1333 (2006.01)
G02F 1/1343 (2006.01)

(52) U.S. Cl. ........................... 349/40; 349/84; 349/139
(58) Field of Classification Search ................ 349/139, 349/40, 84
See application file for complete search history.

(56) References Cited

U.S. PATENT DOCUMENTS

| | | | |
|---|---|---|---|
| 4,449,818 A | | 5/1984 | Yamaguchi et al. |
| 5,781,253 A | * | 7/1998 | Koike et al. ................... 349/40 |
| 5,805,246 A | * | 9/1998 | Lee et al. ...................... 349/40 |
| 5,825,196 A | * | 10/1998 | Irie et al. ..................... 324/770 |
| 6,128,051 A | * | 10/2000 | Kim et al. ..................... 349/40 |
| 6,172,733 B1 | * | 1/2001 | Hong et al. .................. 349/152 |
| 6,392,719 B1 | * | 5/2002 | Kim ............................. 349/40 |
| 6,587,160 B1 | * | 7/2003 | Lee et al. ...................... 349/40 |
| 6,614,053 B1 | * | 9/2003 | Takenaka ...................... 257/66 |
| 6,654,074 B1 | * | 11/2003 | Ha et al. ....................... 349/40 |
| 6,734,925 B1 | * | 5/2004 | Lee et al. ...................... 349/40 |
| 2001/0028415 A1 | * | 10/2001 | Hirabayashi .................. 349/40 |
| 2002/0027621 A1 | * | 3/2002 | Chae ............................ 349/40 |

* cited by examiner

*Primary Examiner*—Tarifur R. Chowdhury
*Assistant Examiner*—Mike Qi
(74) *Attorney, Agent, or Firm*—Brinks Hofer Gilson & Lione (57) ABSTRACT

In a liquid crystal display device that prevents corrosion of a signal line in the device, a plurality of signal lines are provided at the inner side of a cutting line on a substrate. A shorting bar is provided at the outer side of the cutting line. A connection line connects the signal lines to the shorting bar in such a manner to cross the cutting line. Thus, the signal line is connected to the shorting bar with the aid of the connection line formed from a transparent conductive material at an area corresponding to the cutting line of a lower substrate. The connection line is exposed when the lower substrate is cut along the cutting line, so that corrosion of the signal line can be prevented.

32 Claims, 10 Drawing Sheets

LIQUID CRYSTAL DISPLAY DEVICE

This application claims the benefit of priority to Korean Patent Application No. P2001-85371 filed on Dec. 26, 2001.

BACKGROUND OF THE INVENTION

1. Field of the Invention

This invention relates to a liquid crystal display, and more particularly to a liquid crystal display device that is adaptive for preventing corrosion of a signal line.

2. Description of the Related Art

Generally, a liquid crystal display (LCD) controls light transmittance of a liquid crystal in accordance with video signals to display a picture corresponding to the video signals on a liquid crystal display panel. The liquid crystal display panel has liquid crystal cells arranged in a matrix.

The liquid crystal display device requires a plurality of integrated circuits (ICs) connected to data lines and gate lines to apply data signals and scanning signals to the data lines and the gate lines, respectively. Such ICs are provided between a printed circuit board (PCB) and the liquid crystal display panel to apply signals from the PCB to the data lines and the gate lines of the liquid crystal display panel. Different mounting methods of the ICs include a tape automated bonding (TAB) and a chip on glass (COG).

Figure 1:
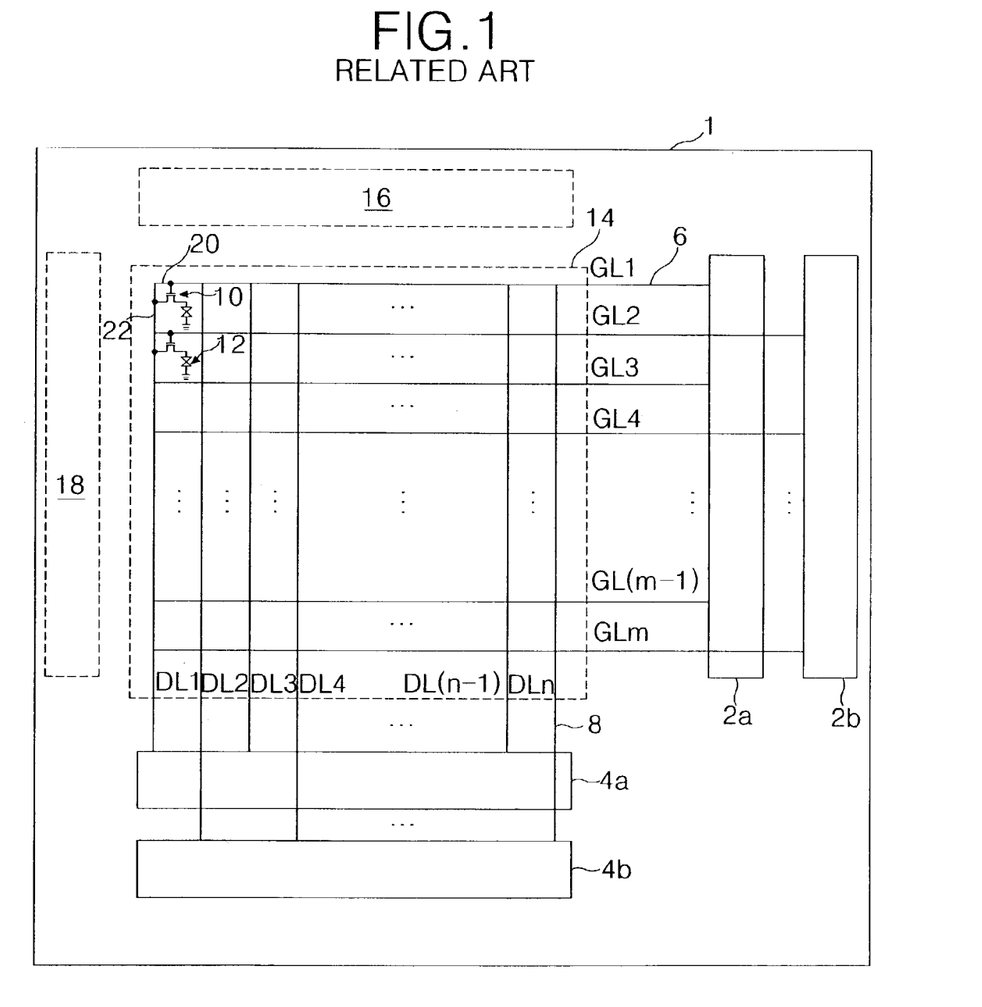
FIG. 1 is a plan view showing a configuration of a conventional liquid crystal display device.

As shown in FIG. 1, a COG-type liquid crystal display device includes a picture display part 14 at which the liquid crystal cells are positioned, first and second gate shorting bars 2a and 2b for testing gate lines 20 of the picture display part 14, and first and second data shorting bars 4a and 4b for testing data lines 22 of the picture display part 14.

The picture display part 14 displays a picture corresponding to video signals such as television signals on a pixel matrix in which pixels are arranged at each intersection between the gate lines 20 and the data lines 22. Each pixel is comprised of a liquid crystal cell 12 for controlling the amount of transmitted light in accordance with a voltage level of a data signal of the data line 22, and a thin film transistor 10 for responding to a scanning signal from the gate line 20 to switch a data signal transferred from the data line 22 into the liquid crystal cell 12. The left side of the picture display part 14 is provided with a gate pad area 18 for mounting a gate driving IC (not shown) while the upper side of the picture display part 14 is provided with a data pad area 16 for mounting a data driving IC (not shown).

Figure 2:
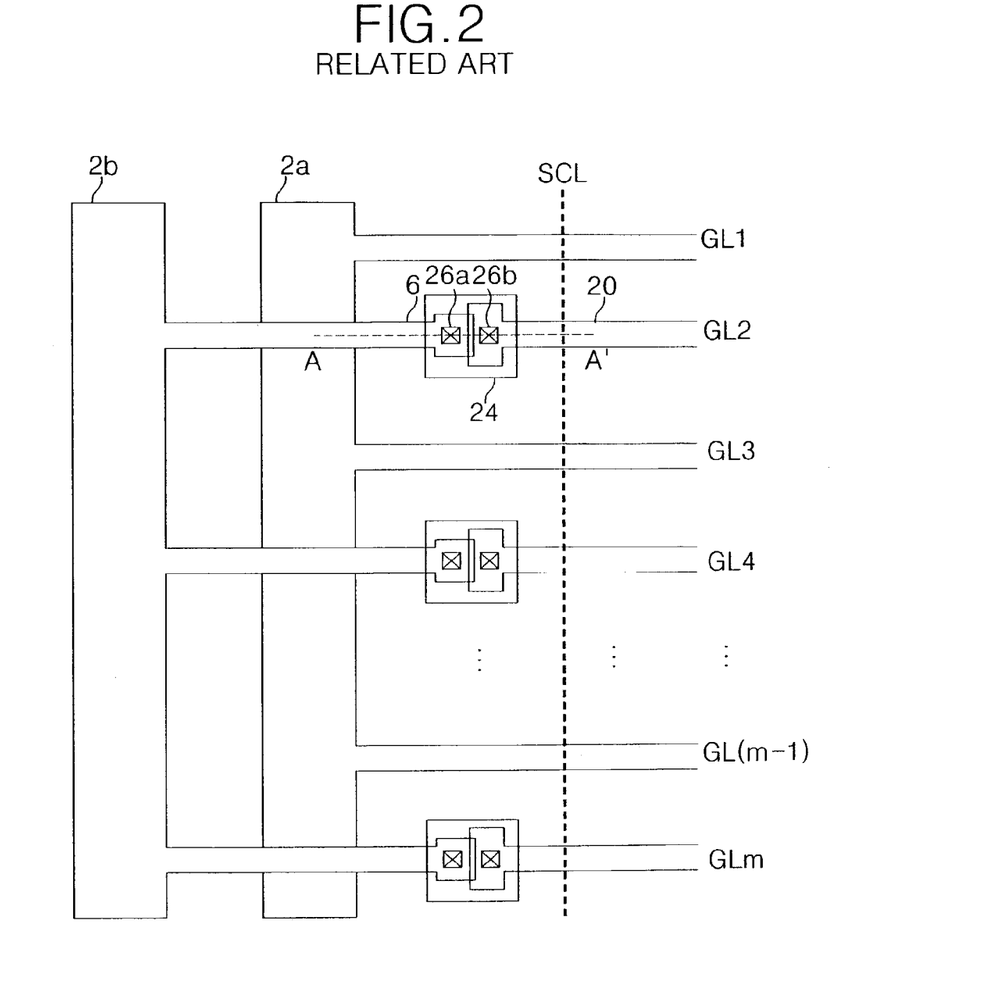
FIG. 2 illustrates connection portions between the gate shorting bars and the gate lines shown in FIG. 1.
Figure 3:
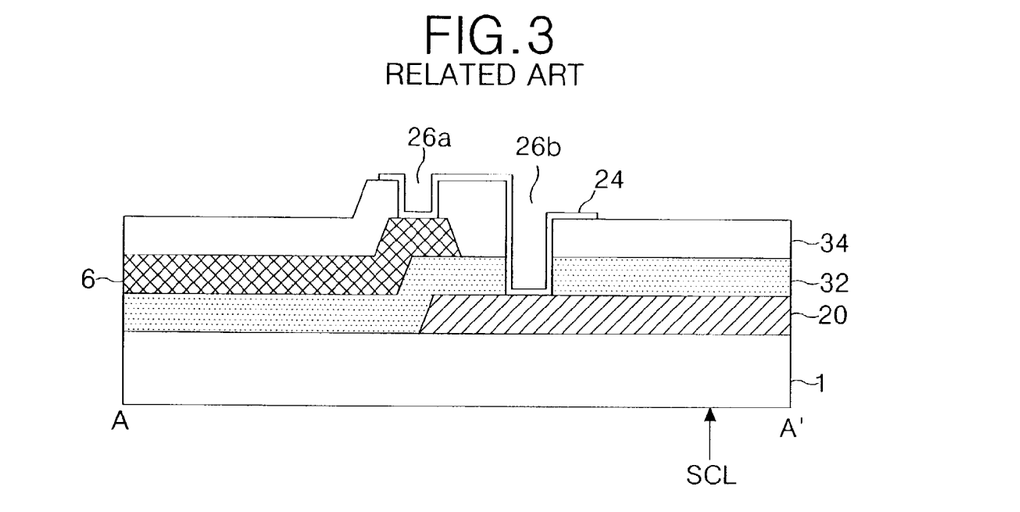
FIG. 3 is a section view of the gate shorting bar and the gate line taken along the A–A' line in FIG. 2.

The first and second gate shorting bars 2a and 2b are provided at the right side of the picture display part 14 because the gate driving IC is mounted onto the gate pad area 18. The first gate shorting bar 2a is formed from a gate metal layer to be directly connected to the odd-numbered gate lines 20 as shown in FIG. 2 and FIG. 3. The second gate shorting bar 2b is formed from a data metal layer, and a gate test electrode 6 extended from the second gate shorting bar 2b is connected, via transparent metal pattern 24, to the even-numbered gate lines 20. The gate test electrode 6 is connected, via a first gate contact hole 26a passing through a protective layer 34, to the transparent metal pattern 24, which is connected, via a second contact hole 26b passing through the protective layer 34 and the gate insulating film 32, to the gate line 20.

Figure 4:
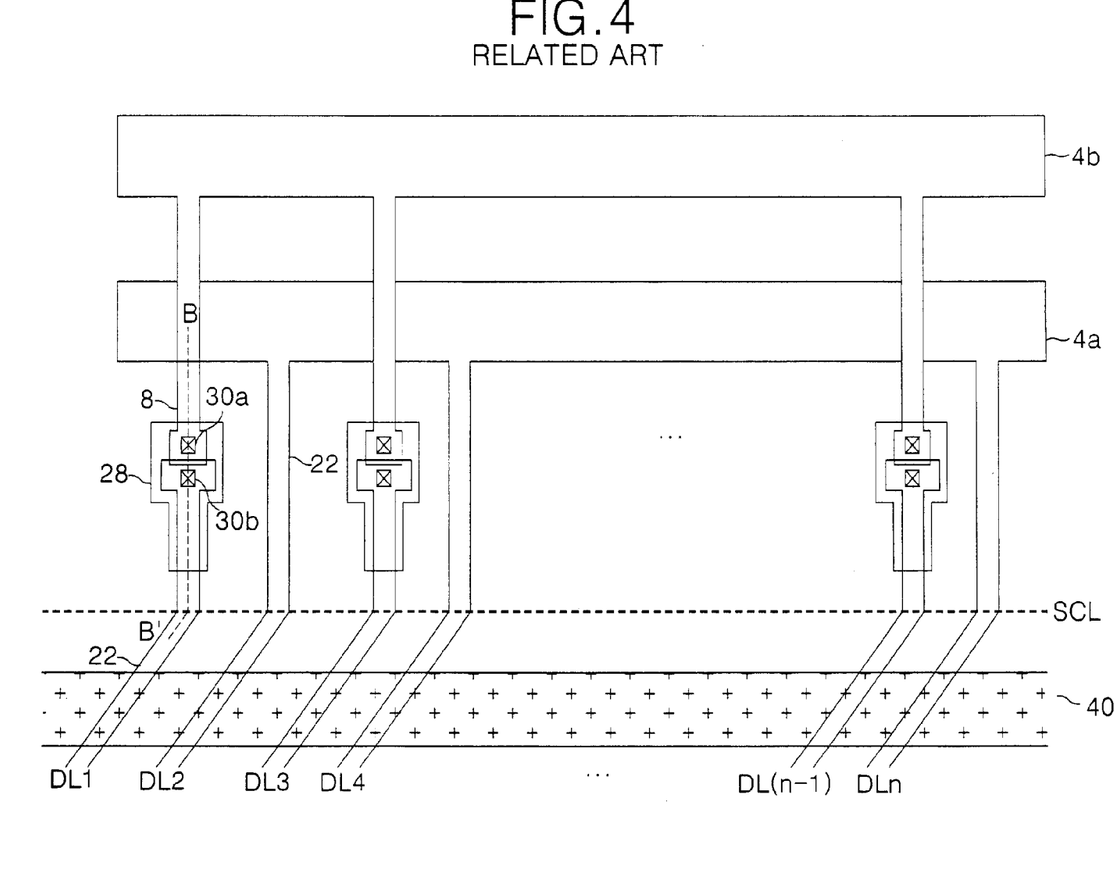
FIG. 4 illustrates connection portions between the data shorting bars and the data lines shown in FIG. 1.
Figure 5:
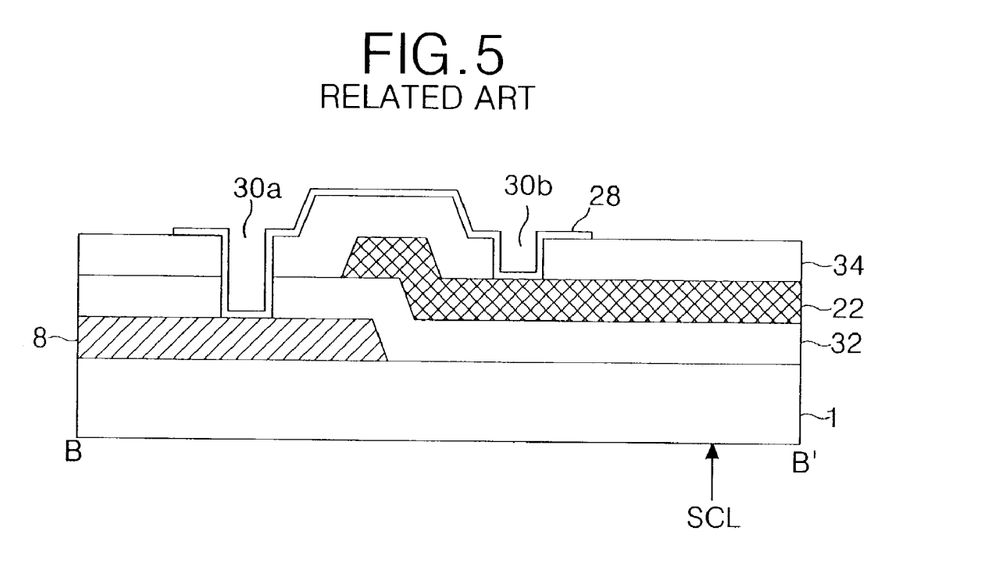
FIG. 5 is a section view of the data shorting bar and the data line taken along the B–B' line in FIG. 4.

The first and second data shorting bars 4a and 4b are provided at the lower side of the picture display part 14 because the data driving IC is mounted onto the data pad area 16. The first data shorting bar 4a is connected, via a data test electrode 8 formed from a gate metal layer, to the odd-numbered data lines 22 as shown in FIG. 4 and FIG. 5. The data test electrode 8 is connected, via a first data contact hole 30a passing through the gate insulating film 32 and the protective layer 34, to the transparent metal pattern 28, which is connected, via a second data contact hole 30b passing through the protective film 34, to the odd-numbered data lines 22. The second data shorting bar 4b is formed from a data metal layer and is directly connected to the even-numbered data lines 22.

The TFT's and the liquid crystal cells provided at the picture display part 14 are tested with the aid of a test signal applied to the gate shorting bars 2a and 2b and the data shorting bars 4a and 4b.

A test process of the gate line will be briefly described below.

First, a voltage level corresponding to a data signal is applied to the data lines 22. At the same time, a voltage level corresponding to a scanning signal is sequentially applied to the first gate shorting bar 2a connected to the odd-numbered gate lines GL1, GL3, GL5, . . . , GLm of the gate lines 20 and the second gate shorting bar 2b connected to the even-numbered gate lines GL2, GL4, GL6, . . . , GL(m-1) thereof.

The TFT's 10 connected to the odd-numbered gate lines GL1, GL3, . . . , GLm is turned on by the scanning signal applied to the first gate shorting bar 2a and, at the same time, a data signal applied to the data lines DL1 to DLn is transferred to the liquid crystal cells 12, thereby driving the liquid crystal cells 12. Likewise, the liquid crystal cells 12 connected to the even-numbered gate lines GL2, GL4, . . . , GL(m-1) are driven with the scanning signal applied to the second gate shorting bar 2b. Herein, if any ones of the gate lines GL and the data lines DL are short-circuited and opened, then the liquid crystal cells 12 corresponding to these lines fail to be driven.

By such a strategy, defects causing short or open circuits of the gate line and the data line and defects of the TFT occurring at the picture display part 14 can be tested. After this test process, if the TFT's and the signal lines have no defects, then the lower substrate 1 is taken along a cutting line SCL and the upper substrate is disposed on the cut lower substrate 1.

However, when the lower substrate 1 of the conventional liquid crystal display device is taken along the cutting line SCL, the data lines 22 and the gate lines 20 are exposed in the side direction. The exposed gate line 22 and data lines 20 and 22 are liable to be corroded in a high temperature and humidity environment or in a state that are supplied with an electric field upon driving of the TFT's. Such corrosion is propagated into the gate lines 20 and the data lines 22, and furthermore may be progressed into the TFT's with the lapse of time.

SUMMARY OF THE INVENTION

Accordingly, it is an object of the present invention to provide a liquid crystal display device that is adaptive for preventing corrosion of a signal line.

In order to achieve these and other objects of the invention, a liquid crystal display device according to an embodiment of the present invention includes a plurality of signal lines provided at the inner side of a cutting line on a substrate; a shorting bar provided at the outer side of the cutting line; and a connection line for connecting the signal lines to the shorting bar in such a manner to cross the cutting line.

In the device, the signal line is a data line or a gate line.

The shorting bar may include a first shorting bar connected to odd-numbered signal-lines of the signal lines and a second shorting bar connected to even-numbered signal lines of the signal lines.

At least one of the first and second shorting bars may be formed from the same material as the connection line. The connection line may be formed from a transparent conductive material. The transparent conductive material in turn may be selected from indium-tin-oxide, indium-zinc-oxide and indium-tin-zinc-oxide.

Either of the first and second shorting bars may be formed from the transparent conductive material, and the other one thereof formed from a gate metal material. The gate metal material may be selected from any one of aluminum (Al) and aluminum/neodymium (Al/Nd).

Otherwise, any one of the first and second shorting bars may be formed from a transparent conductive material, and the other one thereof formed from a data metal material. The data metal material may be selected from any one of chrome (Cr), molybdenum (Mo) and copper (Cu).

Alternatively, the first and second shorting bars may be formed from a different metal material. In such an embodiment, one of the first and second shorting bars may be formed from the data metal material, and the other one thereof formed from the gate metal material.

An insulating film may be provided between the shorting bar and the connection line. The shorting bar may be connected, via a first contact hole passing through the insulating film to expose the shorting bar, to the connection line.

Alternatively, an insulating film may be provided between the connection line and the signal line. In this embodiment, the signal line is connected, via a second contact hole passing through the insulating film to expose the signal line, to the connection line. Further, The second contact hole may be provided at the lower portion of a sealant positioned at the inner side of the cutting line.

Otherwise, the second contact hole may be provided between the cutting line and the sealant.

In another embodiment, a method for preventing corrosion of a liquid crystal display device having a plurality of signal lines comprises providing a shorting bar, providing connection lines that connect the signal lines to the shorting bar, and removing the shorting bar from the liquid crystal display device by cutting along a cutting line and through the connection lines without cutting through the signal lines.

The method may comprise separating the shorting bar into a first shorting bar connected to odd-numbered signal lines of the signal lines and a second shorting bar connected to even-numbered signal lines of the signal lines.

The method may comprise forming at least one of the first and second shorting bars from the same or different material as the connection line, with the materials being the transparent conductive material, the gate metal material, and the data metal material given above.

The method may comprise providing an insulating film between the shorting bar and the connection lines. In such an embodiment, the shorting bar may be connected to the connection lines via first contact holes passing through the insulating film to expose the shorting bar.

The method may comprise providing an insulating film between the signal lines and the connection lines. In such an embodiment, the signal lines may be connected to the connection lines via second contact holes passing through the insulating film to expose the signal lines, and a sealant may positioned at an inner side of the cutting line such that the sealant remains after the shorting bar is removed. In this case, the second contact hole may be formed at a lower portion of the sealant or between the cutting line and the sealant.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 6:
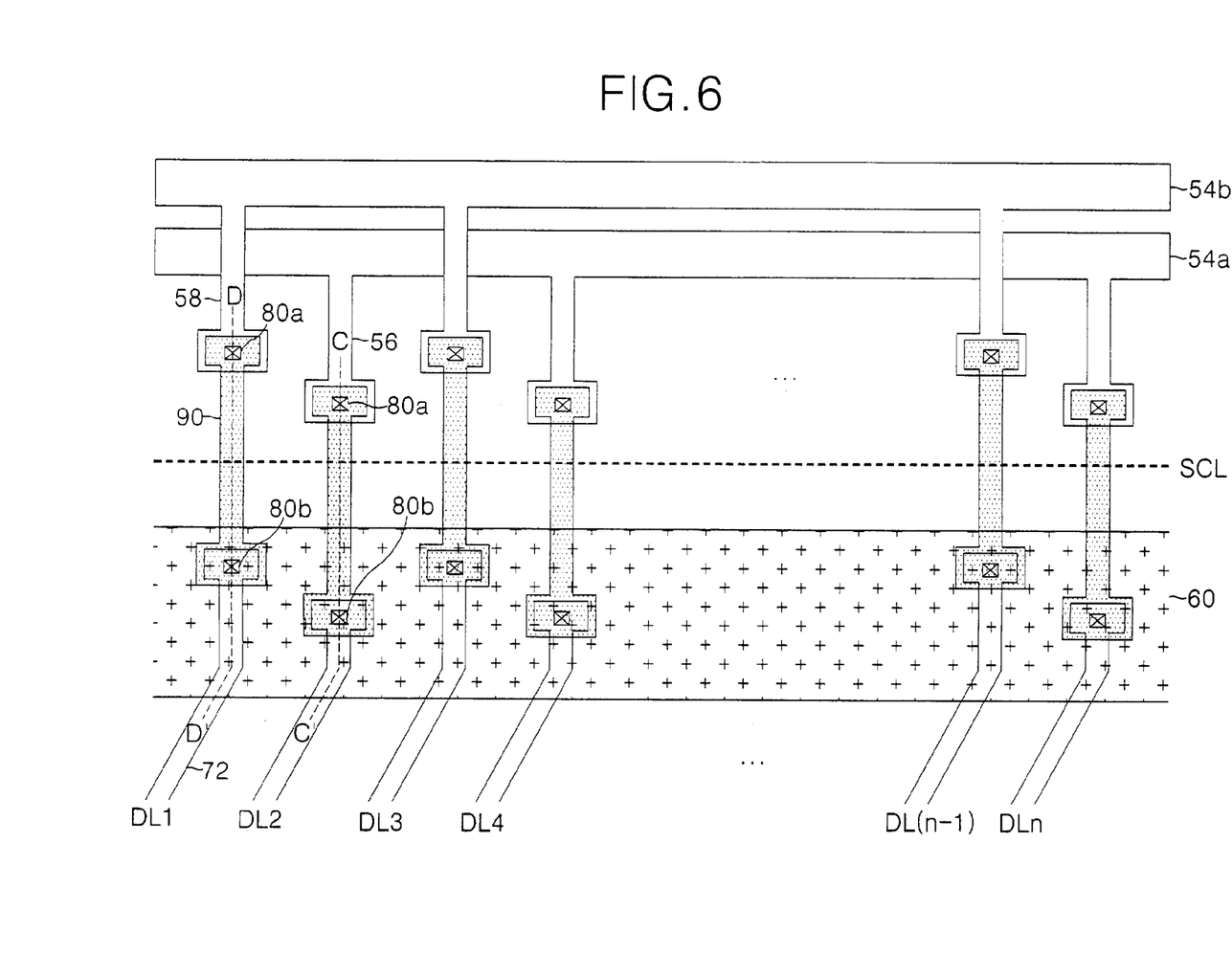
FIG. 6 illustrates data shorting bars of a liquid crystal display device according to a first embodiment of the present invention.

Referring to FIG. 6, there is shown a COG-type liquid crystal display device according to a first embodiment of the present invention.

Figure 7:
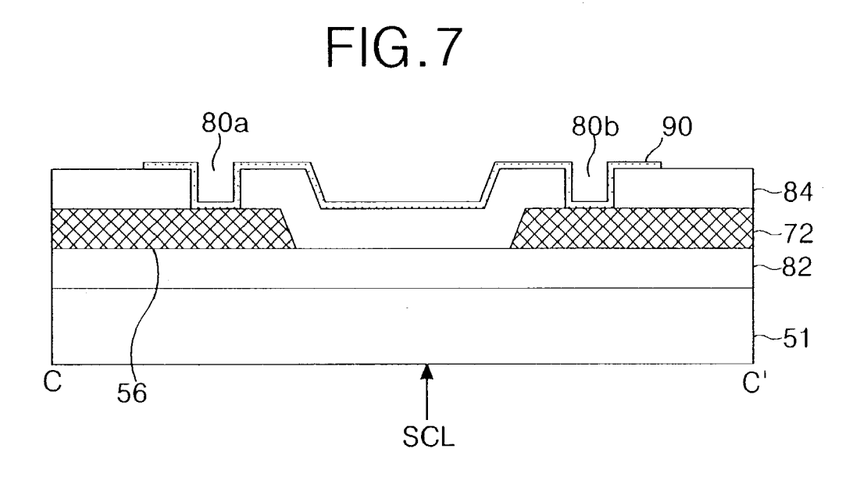
FIG. 7 is a section view of the first data shorting bar and the data line taken along the C–C' line shown in FIG. 6.

The COG-type liquid crystal display device includes first and second data shorting bars 54a and 54b for testing data lines 72. The first and second data shorting bars 54a and 54b are provided at the lower side of the picture display part (not shown). The first data shorting bar 54a is connected to even-numbered data lines DL2, DL4, . . . , DLn for the purpose of testing the even-numbered data lines DL2, DL4, . . . , DLn. The first data shorting bar 54a is formed from a data metal layer such as chrome (Cr), molybdenum (Mo) or copper (Cu), etc., and a first data test electrode 56 extended from the first data shorting bar 54a is formed at a lower substrate 51 provided with a gate insulating film 82 as shown in FIG. 7. The first data test electrode 56 is connected, via a first data contact hole 80a passing through a protective layer 84, to a transparent metal pattern 90. The transparent metal pattern 90 is connected, via a second data contact hole 80b passing through the protective layer 84, to the even-numbered data line 72.

Figure 8:
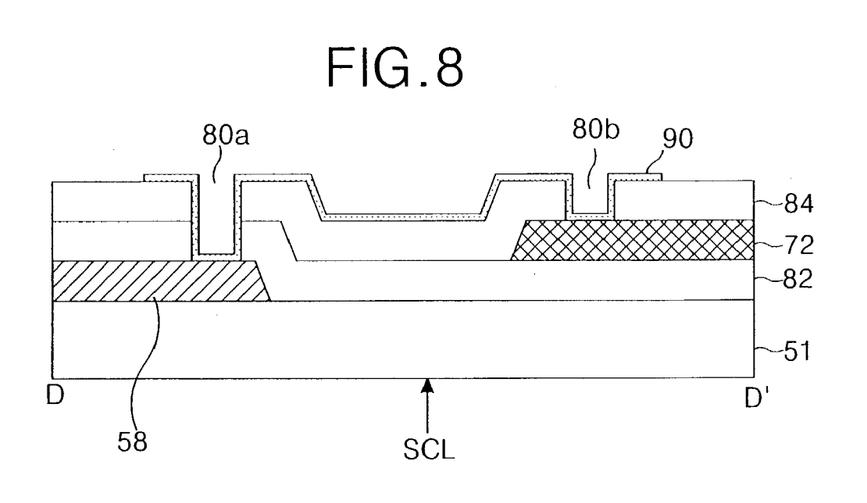
FIG. 8 is a section view of the second data shorting bar and the data line taken along the D–D' line shown in FIG. 6.

The second data shorting bar 54b is connected to odd-numbered data lines DL1, DL3, . . . , DL(n-1) for the purpose of testing the odd-numbered data lines DL1, DL3, . . . , DL(n-1). The second data shorting bar 54b is formed from a gate metal layer such as aluminum (Al) or aluminum/neodymium (Al/Nd); and a second data test electrode 58 extended from the second data shorting bar 54b is provided at the lower substrate 51 as shown in FIG. 8. The second data test electrode 58 is connected, via the first data contact hole 80a passing through the gate insulating film 82 and the protective layer 84, to the transparent metal pattern 90. The transparent metal pattern 90 is connected, via a second data contact hole 80b passing through the protective layer 84, to the odd-numbered data line 72.

The first data contact hole 80a is provided at the outer side of the cell on a basis of a cutting line SCL. The second data contact hole 80b is provided between a sealant 60 and the cutting line SCL, or at the lower portion of the sealant 60. The transparent metal pattern 90 is formed from a transparent conductive material such as indium-tin-oxide (ITO), indium-zinc-oxide (IZO) or indium-tin-zinc-oxide (ITZO), etc.

The transparent metal pattern 90 is provided between the first and second data shorting bars 54a and 54b and the data line 72 in such a manner to cross the cutting line SCL of the lower substrate 51. Thus, since the transparent metal pattern 90, instead of the conventional data line, is exposed when the lower substrate 51 is taken along the cutting line SCL, it becomes possible to prevent a corrosion of the data line 72.

The first and second gate shorting bars (not shown) are formed in similarity to the first and second data shorting bars. More specifically, the transparent pattern is provided between the gate line and the first and second gate shorting bars in such a manner to cross the cutting line. Thus, since the transparent metal pattern, instead of the gate line when the transparent metal pattern is taken along the cutting line, it becomes possible to prevent a corrosion of the gate line.

Figure 12:
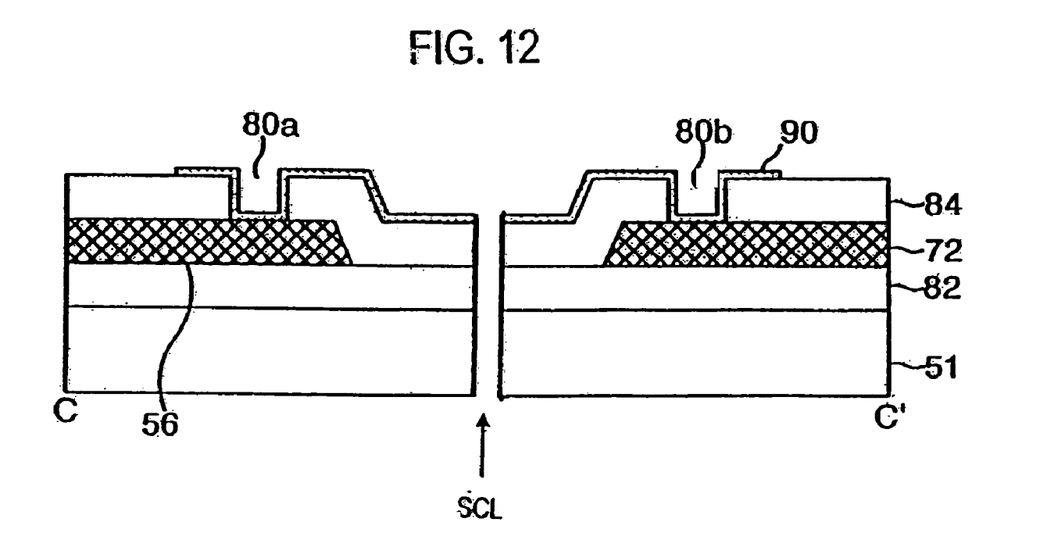
FIG. 12 is a section view of the second gate shorting bar and the gate line taken along the C–C' line shown in FIG. 6 after cutting through the cutting line SCL.

FIG. 12 is a section view of the second gate shorting bar and the gate line taken along the C–C' line shown in FIG. 6 after cutting through the cutting line SCL. As shown in FIG. 12 and previously described, the lower substrate 51 has been cut along the cutting line SCL so that the transparent metal pattern 90 (and protective layer 84) is exposed instead of the data line 72 at the edge of the lower substrate 51. Although similar figures could be provided for each view shown in other figures, the figures are not shown for brevity.

Figure 9:
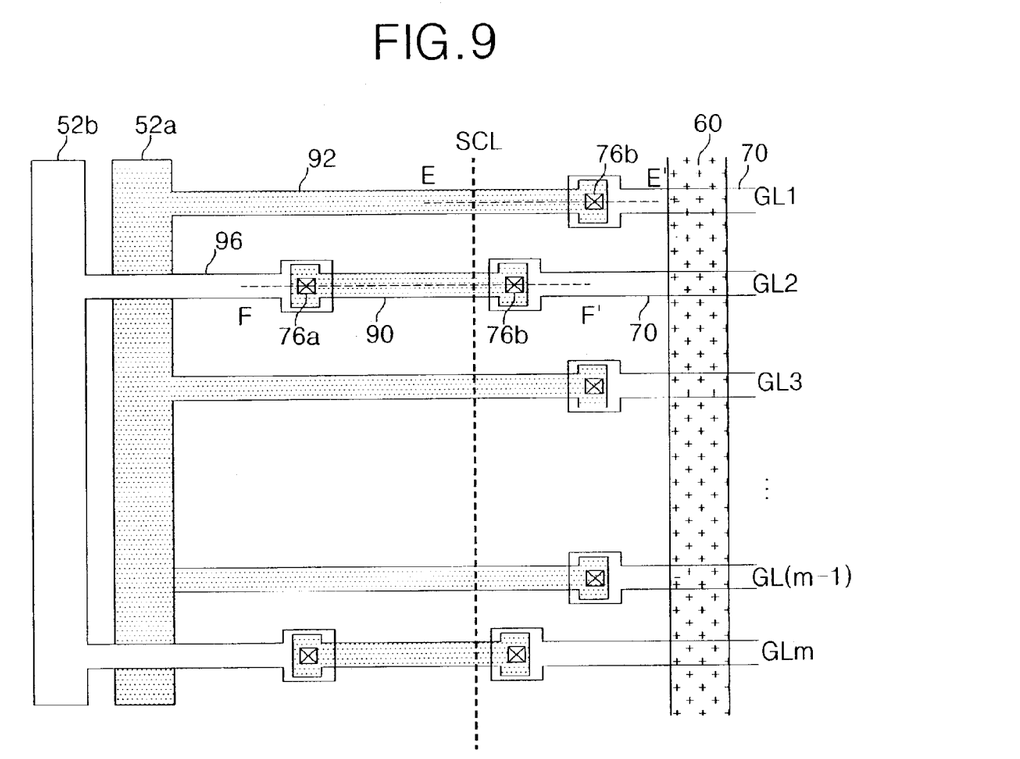
FIG. 9 illustrates gate shorting bars of a liquid crystal display device according to a second embodiment of the present invention.

Referring to FIG. 9, there are shown first and second gate shorting bars of a COG-type liquid crystal display device according to a second embodiment of the present invention.

Figure 10:
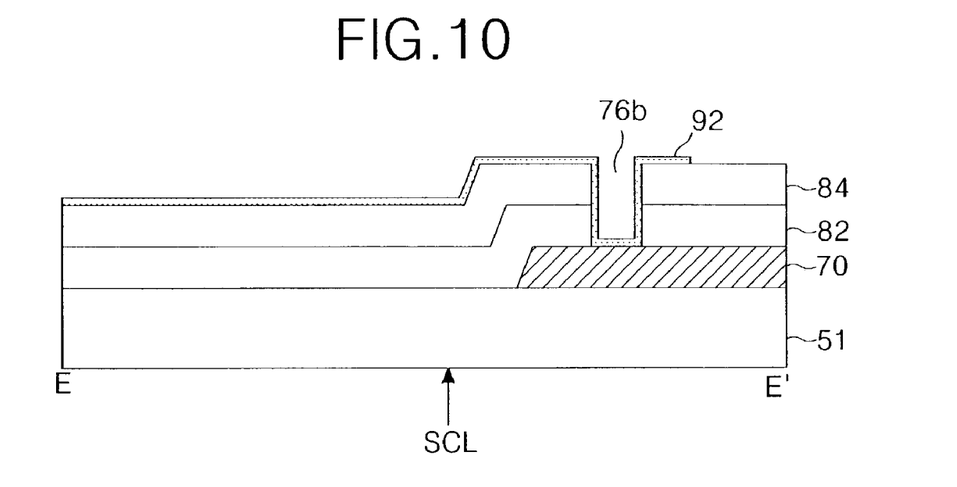
FIG. 10 is a section view of the first gate shorting bar and the gate line taken along the E–E' line shown in FIG. 9.

The first and second gate shorting bars 52a and 52b are provided at the right side of the picture display part (not shown). The first gate shorting bar 52a is connected to odd-numbered gate lines GL1, GL3, . . . , GL(m-1) for the purpose of testing the odd-numbered gate lines GL1, GL3, . . . , GL(m-1). The first gate shorting bar 52a is formed from a transparent metal layer, and a first gate test electrode 92 extended from the first gate shorting bar 52a also is formed from a transparent metal layer as shown in FIG. 10. The first gate test electrode 92 is connected, via a second gate contact hole 76b passing through a gate insulating film 82 and a protective layer 84, to the odd-numbered gate lines 70.

Figure 11:
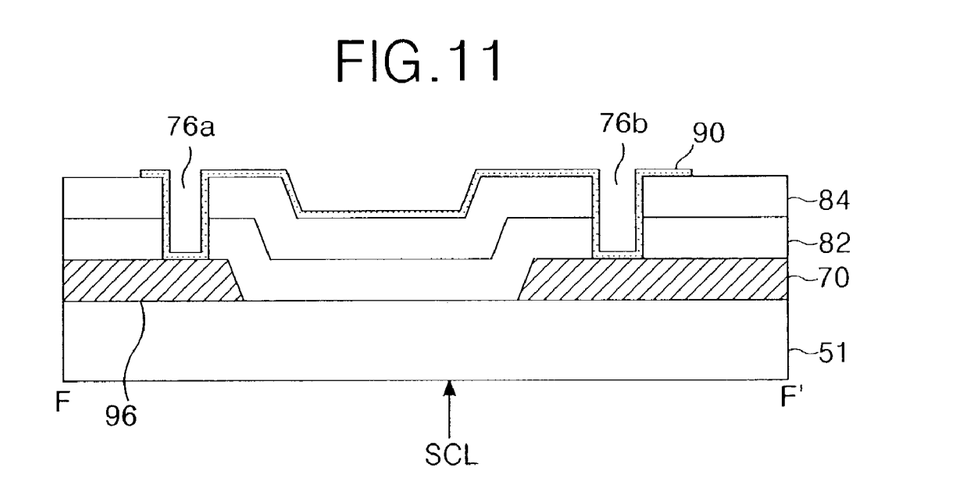
FIG. 11 is a section view of the second gate shorting bar and the gate line taken along the F–F'– line shown in FIG. 9.

The second gate shorting bar 52b is connected to even-numbered gate lines GL2, GL4, . . . , GLm for the purpose of testing the even-numbered age lines GL2, GL4, . . . , GLm. The second gate shorting bar 52b is formed from a gate metal layer, and a second gate test electrode 96 extended from the second gate shorting bar 52b is formed from gate metal layer. The second gate test electrode 96 is connected, via a first gate contact hole 76a passing through the gate insulating film 82 and the protective layer 84, to the transparent metal pattern 90 as shown in FIG. 11. The transparent metal pattern 90 is connected, via the second gate contact hole 76b passing through the gate insulating film 82 and the protective layer 84, to the even-numbered gate lines 72.

The first gate contact hole 76a is provided at the outer side of the cell on a basis of a cutting line SCL. The second gate contact hole 76b is provided between a sealant 60 and the cutting line SCL, or at the lower portion or the sealant 60. The transparent metal patterns 90 and 92 are formed from a transparent conductive material such as indium-tin-oxide (ITO), indium-zinc-oxide (IZO) or indium-tin-zinc-oxide (ITZO), etc.

The transparent metal patterns 90 and 92 are lengthily extended between the first and second gate shorting bars 52a and 52b and an area of the gate line 70 with having the cutting line SCL of the lower substrate 51 therebetween. Thus, the transparent metal patterns 90 and 92, instead of the conventional gate line, are exposed when the lower substrate 51 is taken along the cutting line SCL. Accordingly, it becomes possible to prevent corrosion of the gate line 70.

The first gate shorting bar 52a is formed from a transparent metal layer, and the second gate shorting bar 52b is formed from a transparent metal layer instead of a gate metal layer. Alternatively, the first gate shorting bar 52a may be formed from a gate metal layer.

The first and second data shorting bars (not shown) are formed in similarity to the first and second gate shorting bars. More specifically, any one of the first and second data shorting bars is formed from a transparent metal layer and is connected to the data line. The other shorting bar formed from a gate metal is in contact with the transparent metal pattern via the first contact hole, and the transparent metal pattern is connected, via the second contact hole, to the data line. As mentioned above, the transparent metal pattern crosses the cutting line and, at the same time, the protective layer is disposed between the cutting line and the data line. Accordingly, the transparent metal pattern is exposed when the lower substrate is taken along the cutting line, so that it becomes possible to prevent corrosion of the data line.

As described above, according to the present invention, the signal line and the shorting bar are connected to each other with the aid of the transparent metal pattern at an area corresponding to the cutting line of the lower substrate. Accordingly, of the various lines and thus metals forming the lines, only the transparent metal pattern is exposed when the lower substrate is cut along the cutting line, so that it becomes possible to prevent corrosion of the signal line.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device, comprising:
   a plurality of signal lines provided at an inner side of a cutting line on a substrate;
   a sealant positioned at the inner side of the cutting line;
   a shorting bar provided at an outer side of the cutting line;
   a connection line that connects the signal lines to the shorting bar such the cutting line crosses through the connection line but not the signal lines; and an insulating film provided between the connection line and the signal line, wherein the signal lines are connected, via first contact holes passing through the insulating film to expose the signal lines, to the connection lines, and the first contact holes are provided under the sealant or between the cutting line and the sealant.

2. The liquid crystal display device according to claim 1, wherein said signal line is a data line.

3. The liquid crystal display device according to claim 1, wherein said signal line is a gate line.

4. The liquid crystal display device according to claim 1, wherein said shorting bar includes:
a first shorting bar connected to odd-numbered signal lines of the signal lines; and
a second shorting bar connected to even-numbered signal lines of the signal lines.

5. The liquid crystal display device according to claim 1, wherein at least one of the first and second shorting bars is formed from the same material as the connection line.

6. The liquid crystal display device according to claim 5, wherein the connection line is formed from a transparent conductive material.

7. The liquid crystal display device according to claim 6, wherein said transparent conductive material is selected from indium-tin-oxide, indium-zinc-oxide, and indium-tin-zinc-oxide.

8. The liquid crystal display device according to claim 7, wherein one of the first and second shorting bars is formed from the transparent conductive material and the other one thereof is formed from a gate metal material.

9. The liquid crystal display device according to claim 8, wherein said gate metal material is selected from aluminum (Al) and aluminum/neodymium (Al/Nd).

10. The liquid crystal display device according to claim 7, wherein one of the first and second shorting bars is formed from the transparent conductive material and the other one thereof is formed from a data metal material.

11. The liquid crystal display device according to claim 10, wherein said data metal material is selected from chrome (Cr), molybdenum (Mo) and copper (Cu).

12. The liquid crystal display device according to claim 1, wherein the first and second shorting bars are formed from different metal materials.

13. The liquid crystal display device according to claim 12, wherein one of the first and second shorting bars is formed from a data metal material and the other one thereof is formed from a gate metal material.

14. The liquid crystal display device according to claim 13, wherein said gate metal material is selected from aluminum (Al) and aluminum/neodymium (Al/Nd), and said data metal material is selected from chrome (Cr), molybdenum (Mo) and copper (Cu).

15. The liquid crystal display device according to claim 1, wherein the insulating film is provided between the shorting bar and the connection line.

16. The liquid crystal display device according to claim 15, wherein the shorting bar is connected, via second contact holes passing through the insulating film to expose the shorting bar, to the connection lines.

17. A method for preventing corrosion of a liquid crystal display device having a plurality of signal lines, the method comprising:
providing a shorting bar;
providing connection lines that connect the signal lines to the shorting bar;
providing an insulating film between the signal lines and the connection lines;
connecting the signal lines to the connection lines via first contact holes passing through the insulating film to expose the signal lines;
positioning a sealant at an inner side of the cutting line such that the first contact holes are positioned under the sealant or between the cutting line and the sealant; and
removing the shorting bar from the liquid crystal display device by cutting along a cutting line and through the connection lines without cutting through the signal lines.

18. The method according to claim 17, further comprising separating the shorting bar into a first shorting bar connected to odd-numbered signal lines of the signal lines and a second shorting bar connected to even-numbered signal lines of the signal lines.

19. The method according to claim 17, further comprising forming at least one of the first and second shorting bars from the same material as the connection line.

20. The method according to claim 17, further comprising forming the connection lines from a transparent conductive material.

21. The method according to claim 20, further comprising forming one of the first and second shorting bars from the transparent conductive material and the other one thereof from a gate metal material selected from aluminum (Al) and aluminum/neodymium (Al/Nd).

22. The method according to claim 20, further comprising forming one of the first and second shorting bars from the transparent conductive material and the other one thereof from a data metal material selected from chrome (Cr), molybdenum (Mo) and copper (Cu).

23. The method according to claim 17, further comprising forming the first and second shorting bars from different metal materials.

24. The method according to claim 23, further comprising forming one of the first and second shorting bars from a data metal material selected from chrome (Cr), molybdenum (Mo) and copper (Cu) and the other one thereof is formed from a gate metal material selected from aluminum (Al) and aluminum/neodymium (Al/Nd).

25. The method according to claim 17, further comprising providing the insulating film between the shorting bar and the connection lines.

26. The method according to claim 25, further comprising connecting the shorting bar to the connection lines via second contact holes passing through the insulating film to expose the shorting bar.

27. A display device comprising:
a plurality of signal lines provided at an inner side of a cutting line on a substrate;
a shorting bar provided at an outer side of the cutting line;
a plurality of test electrodes extending from the shorting bar;
a plurality of connection lines that connect the signal lines to the test electrodes such that the cutting line crosses through the connection lines but neither the signal lines nor the test electrodes; and
an insulating film disposed between the connection lines and the test electrodes and the connection lines and the signal lines, wherein one of the test electrodes and the signal lines are connected, via first contact holes passing through the insulating film to expose the one of the test electrodes and the signal lines to the connection lines.

28. The display device according to claim 27, wherein the connection lines are formed from a conductive material that is more corrosion resistant than the signal lines.

29. The display device according to claim 27, wherein the test electrodes and the signal lines terminate without overlapping and are laterally separated by an insulating film.

30. The display device according to claim 27, wherein the other of the test electrodes and the signal lines are connected, via second contact holes passing through the insulating film to expose the other of the test electrodes and the signal lines, to the connection lines.

31. The display device according to claim 30, wherein the second contact holes are provided under a sealant positioned at the inner side of the cutting line.

32. The display device according to claim 30, wherein the second contact holes are provided between the cutting line and a sealant.

* * * * *